W. R. JOHNSTON & J. A. SCHLOTTERBECK.
MEAT GRINDING ATTACHMENT.
APPLICATION FILED MAY 12, 1915.
1,217,006.
Patented Feb. 20, 1917.
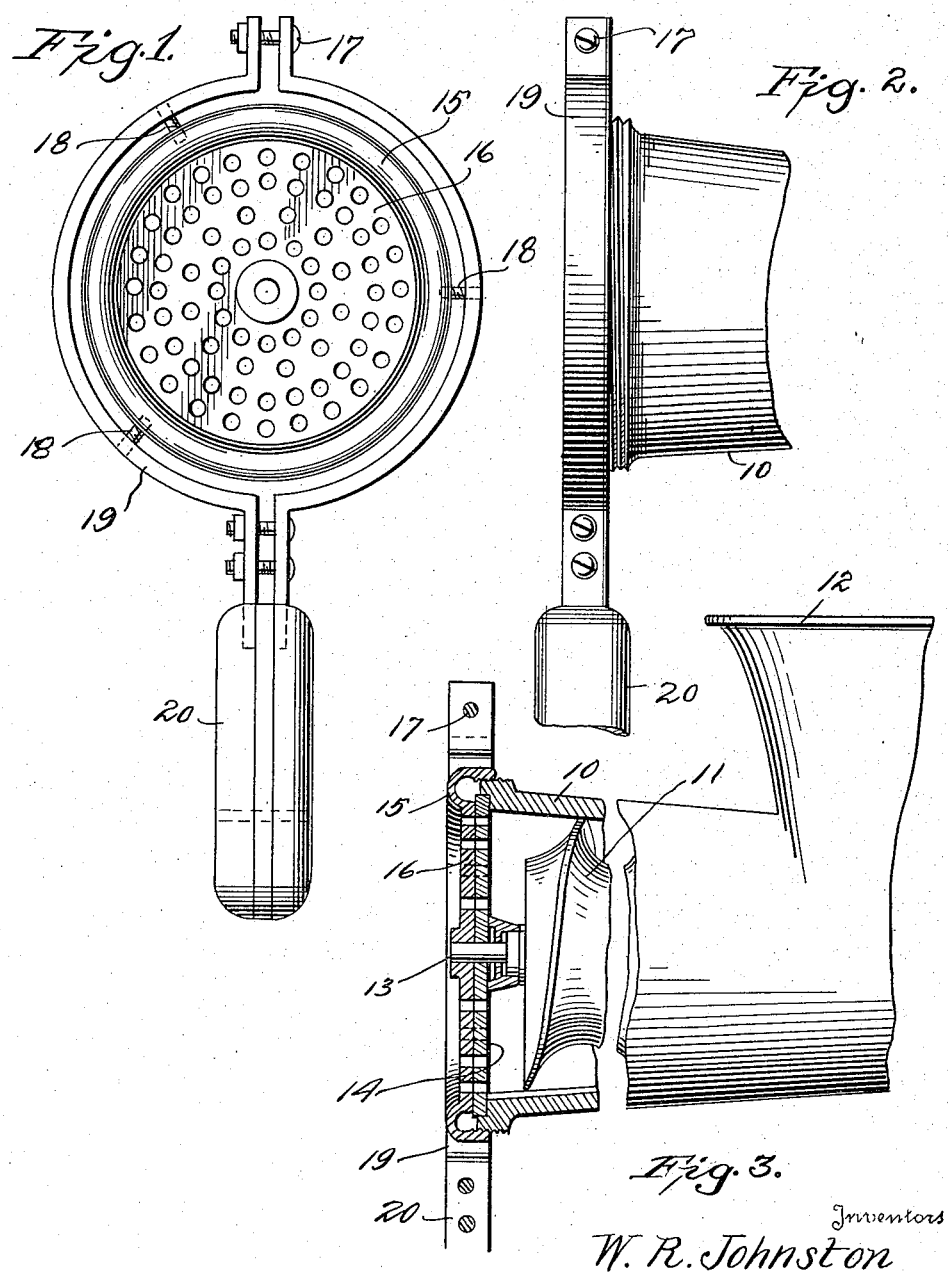

UNITED STATES PATENT OFFICE.

WALTER R. JOHNSTON AND JOHN A. SCHLOTTERBECK, OF HILLSDALE, NEW JERSEY.

MEAT-GRINDING ATTACHMENT.

1,217,006.    Specification of Letters Patent.    Patented Feb. 20, 1917.

Application filed May 12, 1915. Serial No. 27,676.

*To all whom it may concern:*

Be it known that we, WALTER R. JOHNSTON and JOHN A. SCHLOTTERBECK, citizens of the United States, residing at Hillsdale, in the county of Bergen, State of New Jersey, have invented certain new and useful Improvements in Meat-Grinding Attachments; and we do hereby declare the following to be a full, clear, and exact description of the invention, such as will enable others skilled in the art to which it appertains to make and use the same.

This invention relates to improvements in meat grinding machines and particularly to the cutting knives of machines of this character.

The principal object of the invention is to provide a means for turning one of the knives so as to relieve the knives of frictional contact until the motor operating the machine has attained the proper speed.

Other objects and advantages will be apparent from the following description when taken in connection with the accompanying drawing.

In the drawing:

Figure 1 is an end elevation of a portion of a meat grinder machine having our improved adjusting device mounted thereon, Fig. 2 is a side elevation of the same, Fig. 3 is a vertical central longitudinal sectional view through the knife and portion of the grinder.

In the ordinary motor driven meat grinding machine there is a stationary knife and a rotatable knife each formed with openings through which the meat is forced by the feed screw so that a shearing action takes place on the meat by the surrounding walls of the openings of said plates. This frictional contact of the two knives greatly retards the starting of the electric motor and sometimes prevents the motor from starting causing short circuits in the motor and consequent burning out of the winding thereof.

It is the principal object of this invention to overcome this difficulty by providing means for moving the stationary knife out of frictional contact with the rotary knife so that the motor can immediately start and get up a proper speed before the stationary knife is brought back into contact with the rotary knife.

Referring particularly to the accompanying drawing, 10 represents the casing of the grinder, 11 the feed screw therein and 12 the hopper into which the meat is fed. The outer end of the feed screw has the usual central stem 13 which projects through the center of the rotary knife 14 secured thereto and rotatable therewith. The outer end of the casing carries a threaded cap or ring 15 which holds the stationary knife 16 against the rotary knife. Engaged around the ring 15 and clamped thereto by the bolts 17 and 18 is a band 19, two of the ends of which are extended away from the band to form a handle 20.

It will thus be seen that when the handle is grasped and the ring 15 rotated in one direction the same will be unscrewed, thus loosening the stationary disk so that there will be no great friction between it and the rotating disk. When the motor is started the same can start freely without the load imposed on it by the frictional contact of the two cutting disks. After the motor has attained the proper speed the handle 20 is grasped and the ring 15 turned in the opposite direction so as to force the stationary cutting disk frictionally into engagement with the rotating cutting disk.

This device is of simple and cheap construction and can be readily applied to the motor driving meat grinding machine now in use without modification thereto, it being only necessary to place the band around the screw ring and clamp the same thereto.

What is claimed is:

An attachment for food choppers of the type embodying a rotary perforated disk, and a relatively stationary disk threaded on the discharge end of the hopper to frictionally engage the rotary disk when the chopper is in operation, said attachment consisting of a pair of substantially semicircular members corresponding ends of which are extended in parallel relation, means connecting said extended ends, a handle carried by the members, and clamping screws threaded in the members, said members being arranged to encircle the stationary disk and said screws being movable to clamp said disk whereby rotation of the handle will serve to move the disk on its threads into and out of frictional engagement with the rotary disk.

In testimony whereof, we affix our signatures in the presence of two witnesses.

WALTER R. JOHNSTON.
JOHN A. SCHLOTTERBECK.

Witnesses:
A. E. SMITH,
EDYTHE HERBERT.